(12) United States Patent
Chamousset

(10) Patent No.: US 8,821,027 B2
(45) Date of Patent: Sep. 2, 2014

(54) SUSPENSION STOP WITH REINFORCED SEALING

(75) Inventor: Anthony Chamousset, Sales (FR)

(73) Assignee: NTN-SNR Roulements, Annecy (FR)

( * ) Notice: Subject to any disclaimer, the term of this patent is extended or adjusted under 35 U.S.C. 154(b) by 105 days.

(21) Appl. No.: 13/433,668

(22) Filed: Mar. 29, 2012

(65) Prior Publication Data

US 2012/0308167 A1 Dec. 6, 2012

(30) Foreign Application Priority Data

Mar. 30, 2011 (FR) ...................................... 11 00941

(51) Int. Cl.
F16C 19/10 (2006.01)
F16C 33/76 (2006.01)
F16C 33/80 (2006.01)

(52) U.S. Cl.
USPC .............. 384/609; 384/91; 384/480; 384/607

(58) Field of Classification Search
USPC ................. 384/477, 480, 607, 609, 611, 617; 267/179, 219–221; 280/124.147, 280/124.155
See application file for complete search history.

(56) References Cited

U.S. PATENT DOCUMENTS

| | | | | |
|---|---|---|---|---|
| 5,467,971 A | * | 11/1995 | Hurtubise et al. | ............. 267/220 |
| 6,126,155 A | * | 10/2000 | Smith et al. | ..................... 267/220 |
| 6,267,512 B1 | * | 7/2001 | Beghini et al. | ................. 384/609 |
| 6,296,396 B1 | | 10/2001 | Schwarzbich | |
| 6,736,381 B2 | * | 5/2004 | Chesne | .......................... 267/220 |
| 6,814,496 B2 | * | 11/2004 | Beghini et al. | ................. 384/617 |
| 7,077,248 B2 | * | 7/2006 | Handke et al. | ........... 188/321.11 |
| 7,114,853 B2 | * | 10/2006 | Debrailly et al. | ............. 384/612 |
| 7,364,177 B2 | * | 4/2008 | Handke et al. | ......... 280/124.147 |
| 7,473,036 B2 | * | 1/2009 | Handke | .......................... 384/617 |
| 7,922,397 B2 | * | 4/2011 | Beauprez et al. | ............. 384/609 |
| 8,308,176 B2 | * | 11/2012 | Lenon et al. | ........... 280/124.147 |
| 2005/0089255 A1 | * | 4/2005 | Debrailly et al. | ............. 384/609 |
| 2005/0242542 A1 | * | 11/2005 | Handke et al. | ......... 280/124.155 |
| 2011/0101584 A1 | * | 5/2011 | Viault et al. | .................. 267/221 |
| 2011/0293214 A1 | * | 12/2011 | Houdayer et al. | ............ 384/606 |

FOREIGN PATENT DOCUMENTS

| | | |
|---|---|---|
| EP | 1000781 A1 | 5/2000 |
| EP | 1870265 A1 | 12/2007 |
| FR | 2857906 A1 | 1/2005 |
| FR | 2909929 A1 | 6/2008 |
| WO | 2009019340 A2 | 2/2009 |

OTHER PUBLICATIONS

French Search Report dated Oct. 17, 2011.

* cited by examiner

*Primary Examiner* — Marcus Charles
(74) *Attorney, Agent, or Firm* — Bachman & LaPointe, P.C.

(57) ABSTRACT

A suspension stop device for a suspension arm of a vehicle, having a coil spring, having a stop bearing defining a rotation axis of the device and a bottom metal washer turning with respect to a top metal washer; a support piece for transmitting to the bottom washer forces exerted by the spring, the support piece comprising a support zone for the bottom washer; a cover covering the top washer and delimiting with the support piece a housing for the bearing, the cover being provided with a skirt covering a peripheral zone of the support piece and delimiting with the peripheral zone of the support piece an annular labyrinth, disposed radially outside the housing and connecting the housing to the outside; and an annular deflector delimiting with the skirt of the cover at least one top opening and with the support piece at least one bottom opening.

13 Claims, 1 Drawing Sheet

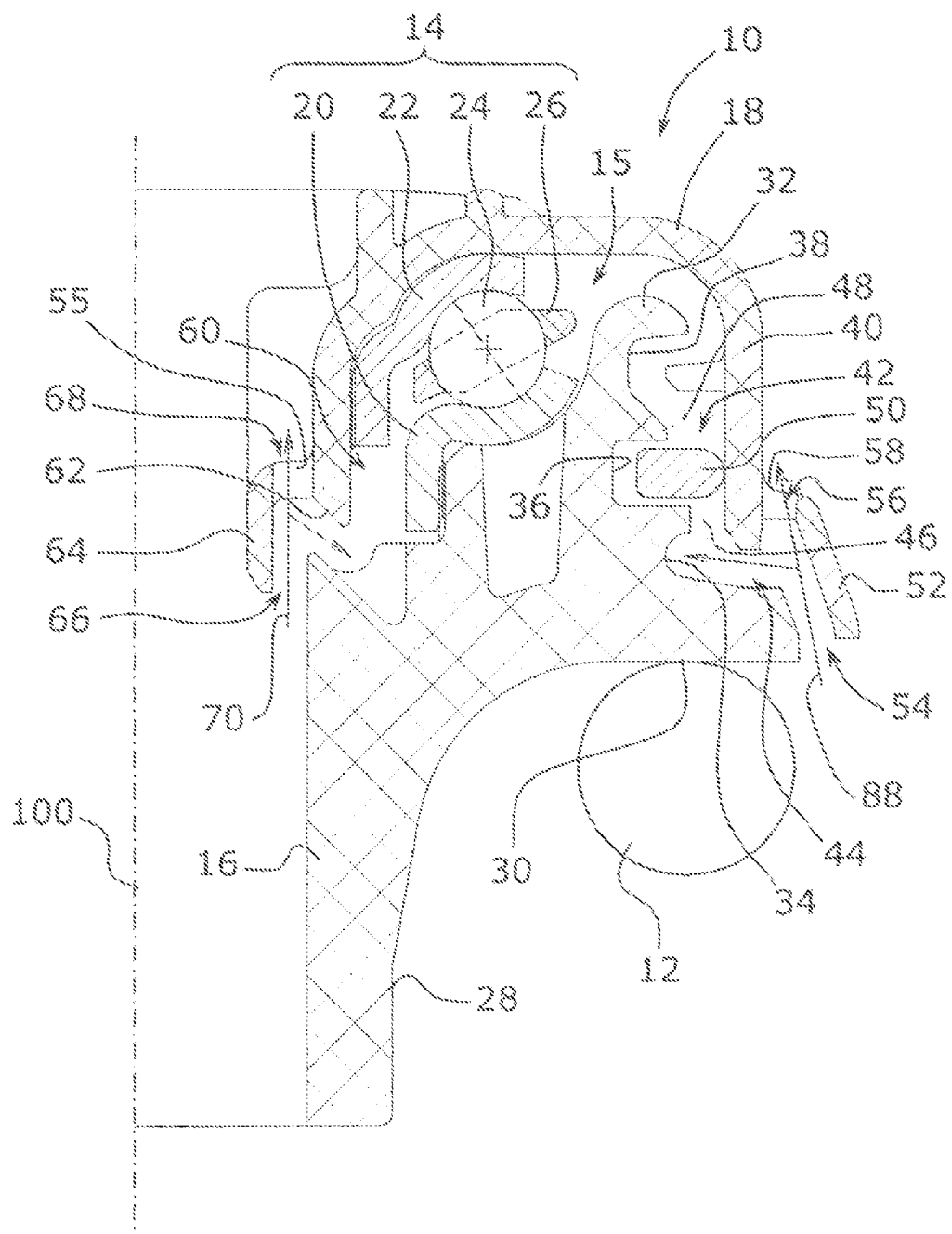

SUSPENSION STOP WITH REINFORCED SEALING

BACKGROUND

1. Technical Field of the Invention

The invention relates to a suspension stop for a vehicle suspension arm, in particular for a telescopic suspension arm of a motor vehicle steered wheel, provided with a bearing and means of protecting this bearing.

2. Prior Art

Traditionally, suspension stop bearings are housed in casings in two parts, closed by sealing lips fixed to one of the parts of the casing and sliding over the other part of the casing, as illustrated in the document EP 1 000 781. This technology has the disadvantage of causing a sliding torque between the rotating parts, referred to as drag torque, which is particularly detrimental in applications to steered wheels.

To eliminate this drag torque, it has been proposed to replace the traditional sealing linings with contactless chicane devices, that is to say devices in which the rotating elements are interleaved in one another, without contact, so as to create a significant pressure drop between the outside and the bearing housing. A first example of this type of technology is offered by the document FR 2 857 906, which describes a suspension stop for a suspension arm with a coil spring, comprising a stop bearing defining a rotation axis of the device and provided with a bottom metal washer turning with respect to a top metal washer. A support piece made from synthetic material is disposed between the coil spring and the bearing to transmit the forces exerted by the spring to the bottom washer. A cover covers the top washer and delimits with the support piece a housing for the bearing. The cover is provided with a cylindrical skirt covering, without contact, a cylindrical peripheral zone of the support piece and delimiting a pressure drop device between the housing and the outside. The simple structure of the pressure drop device makes it possible to accommodate relative movements between the cover and the support piece, movements that are due in particular to the low rigidity of the bearing washers. However, ingress of liquid by capillarity is not excluded and the seal is not of good quality.

To make it possible, without friction and without significantly increasing the axial and radial bulk, to ensure a good-quality seal between the rotating elements of a suspension stop, there was proposed in the document FR 2901179 a suspension stop device for a suspension arm of a vehicle, the arm being provided with a coil spring, the device comprising: a rigid stop bearing defining a rotation axis of the device and provided with a bottom metal washer turning with respect to a top metal washer; a support piece made from synthetic material for transmitting to the bottom washer the forces exerted by the spring, the intermediate support piece comprising an annular support area for the bottom washer; and a cover covering the top washer and delimiting with the support piece a housing for the bearing, the cover being provided with a skirt covering without contact a peripheral area of the support piece and delimiting with the peripheral area of the support piece an annular labyrinth, disposed radially outside the housing and connecting the housing to the outside, the annular labyrinth comprising successively, from the inside to the outside of the housing, a first annular pressure drop device with radial clearance J1, a second annular pressure drop device with radial clearance J2, and a third annular pressure drop device with radial clearance J3. The rigidity of the bearing makes it possible to achieve relatively small clearances, without risk of friction at the labyrinth.

Another solution explored in the document WO 2009/019340 for both avoiding risks of uncontrolled friction at the labyrinth in the case of deformation of the parts and the excessive friction of a peripheral sealing lip, consists of disposing a sealing element in the space between the cover and the spring support, sized so as to be in rubbing contact firstly with the cover and secondly with the spring support, said sealing element being mounted so as to be able to move with respect at least to the spring support or to the cover.

However, new practices with regard to washing of vehicles and in particular washing the underside of the body by high-pressure water jet, shift the requirements with regard to protection of suspension stop bearings.

SUMMARY OF THE INVENTION

The invention aims to remedy all or some of the drawbacks of the prior art identified above, and in particular to propose a suspension stop device preventing ingresses of water under pressure sprayed by a cleaning nozzle.

To do this, there is proposed, according to a first aspect of the invention, a suspension stop device for a vehicle suspension arm, the arm being provided with a coil spring, the device comprising:

- a stop bearing defining a rotation axis of the device and provided with a bottom metal washer turning with respect to a top metal washer;
- a support piece made from synthetic material for transmitting to the bottom washer the forces exerted by the spring, the support piece comprising a support zone for the bottom washer; and
- a cover covering the top washer and delimiting with the support piece a housing for the bearing, the cover delimiting with the support piece an annular labyrinth connecting the housing to the outside, and
- an annular deflector delimiting with the cover at least one top annular opening and with the support piece at least one bottom opening, the top and bottom openings constituting top and bottom entry channels from the outside in the same entry portion of the labyrinth.

The presence of at least two openings enables one of them to serve as a diversion in the case of spraying a cleaning fluid under high pressure through the other one. More specifically, a pressurised water jet entering through the bottom opening would be at least partially discharged through the top opening, and the pressure at the entry portion in the labyrinth will remain controlled, preventing an ingress of water in the bearing.

Preferentially, the deflector is disposed so that a light ray entering through the bottom opening leaves through the top opening without reflection and without entering the entry portion of the labyrinth. In this way the pressure rise in the entry portion is minimised.

Preferentially, the labyrinth also comprises at least one second portion connecting the first portion to the bearing.

According to a particularly advantageous geometric arrangement, the entry portion in the labyrinth extends from the deflector radially inwards, that is to say towards the rotation axis. This entry portion can be essentially radial or have a certain inclination conferring on it a generally tapered shape pointing towards the bearing. The latter arrangement assists the discharge of water. Preferentially, the labyrinth has a second labyrinth portion connecting the entry portion to the bearing. Preferentially, the entry portion is connected to the second portion of the labyrinth by an axial annular opening, delimited between the support piece and the cover. According to a particularly advantageous embodiment, the entry portion extends radially towards the inside as far as an annular groove, the axial annular opening connecting the entry portion to the second portion being situated radially outside the annular groove. The annular groove thus constitutes a chamber intended to limit the pressure at the axial annular opening.

According to one embodiment, the device also comprises a sealing gasket working by sliding contact disposed in the labyrinth. This sealing gasket may be disposed in the second portion. According to one embodiment, which is preferred, this sealing gasket is able to slide over a sliding surface of the bottom support piece and over a sliding surface of the cover.

The deflector may be a part constituting the cover or the support piece, or be attached to the cover or support piece.

In the case of a deflector integrated in or fixed to the cover, the bottom opening is preferably annular and preferably faces a plurality of top openings disposed on the circumference of the cover and separated in pairs by connecting bridges between the deflector and the cover.

According to a preferred embodiment, the labyrinth is disposed radially outside the housing. More generally, the labyrinth and the deflector are situated radially outside the washers of the thrust bearing. It is in this case an external peripheral protection that is obtained. In practice, the cover has a skirt covering without contact a peripheral zone of the support piece and defining the labyrinth with the peripheral zone.

Alternatively, the deflector can be designed to protect an internal peripheral labyrinth, situated radially inside the housing of the stop bearing.

Naturally, one option is not exclusive of the other and two deflectors as described previously can be provided, one for protecting an external labyrinth and the other an internal labyrinth.

According to another aspect of the invention, this relates to a method for reducing or preventing an injection of water in a suspension stop device, consisting of providing two annular openings connecting in parallel to the outside, an entry portion in a labyrinth situated between a bottom support piece and a housing cover of a bearing of the suspension stop device.

BRIEF DESCRIPTION OF THE DRAWINGS

Other features and advantages of the invention will emerge from a reading of the following description, with reference to FIG. 1, which illustrates a suspension stop device according to a preferred embodiment.

DETAILED DESCRIPTION OF THE PREFERRED EMBODIMENT(S)

FIG. 1 shows a suspension stop device 10 intended to constitute a pivoting interface between a top turn of a coil spring 12 and the body of a vehicle. This stop device 10 comprises a bearing 14 providing the pivoting connection about an axis 100, this bearing 14 being housed in an annular cavity 15 between a bottom support piece 16 under which the top turn of the spring 12 will bear, and a protective cover 18. Where applicable, filtering blocks (not shown) can be provided between the top turn of the spring and the support piece, and/or above the cover. The cover 18 is conformed so as to be housed either directly in a cavity provided for this purpose in the body, or on an interface plate for fixing to the body. In the example considered, the bearing 14 is a roller bearing consisting of a bottom washer 20 and a top washer 22 forming rolling tracks for rolling bodies 24 that are moreover guided in a guide cage 26. The bottom washer 20 rests on reliefs on the bottom support piece 16 provided for this purpose, whereas the top washer is housed in the cover 18.

The support piece 16 comprises, on the side opposite to the bearing, a cylindrical skirt 28 for guiding the spring, and a transverse shoulder 30 supporting the spring 12. Between the shoulder 30 and the spring 12 the annular end of a concertina collar (not shown) can be interposed, intended for protecting the damper against external pollution, this end of the collar forming where applicable a mechanical filter between the spring and the bottom support piece 16, making it possible in particular to limit the transmission of noises from the running of the wheel to the body of the vehicle. The support piece 16 also comprises an annular wall 32 situated radially outside the bearing 14 and projecting towards the cover 18, this wall 32 having several annular grooves 34, 36, 38, here three in number, open radially towards the cover 18.

The cover 18 has an external skirt 40 disposed opposite this annular wall 32. The cover 18 and support piece 16 are arranged so as not to come into direct contact with each other and to form between them an annular passage in a labyrinth 42, taking advantage of the annular grooves 34, 36, 38 of the annular wall 32 of the support piece 16. In this example embodiment, the labyrinth 42 consists of an essentially radial annular entry portion 44 having a bottom formed by the annular groove 34, a second portion at the annular groove 36 forming a chamber connected to the entry portion 44 by a narrow axial annular opening 46, and a third portion formed at the annular groove 38, connected to the second portion by a narrow annular opening 48.

A movable sealing gasket 50 is housed in the chamber 36 of the second portion. The gasket 50 is in sliding radial abutment against the skirt 40 of the cover and is sized so as to have, with the support piece 16, an axial and radial functional clearance. During high mechanical forces causing deformations or relative movements between the support piece 16 and the cover 18, the sealing gasket 50 is able to come into contact with a wall of the support piece 16, but this possible double sliding contact with the support piece 16 and the cover 18 generates only a low friction torque.

Moreover, the gasket 50 can be caused to move axially in order to close the passage 48 between the second and third portions, if it undergoes significant pressure.

The cover 18 is moreover provided with a deflector 52 that protects the entry portion 44 of the labyrinth. This deflector consists of an annular wall disposed radially outside and facing the entry portion 44, preventing direct access in a straight line to this entry portion 44. The wall of the deflector 52 is extended downwards opposite the support piece 16 in order to form with the support piece 16 an annular bottom opening 54 for access to the entry portion 44. It is also extended upwards opposite the skirt 40 of the cover in order to form with the skirt 40 of the cover top openings 56 for access to the entry portion 44. The top openings 56 are separated by bridges 58 of material connecting the deflector 52 to the skirt 40 of the cover, but the effective total cross-section of the top openings 56 remains high, greater than half of the effective cross-section of the bottom opening 54.

As illustrated in the FIGURE, a ray of light 88 entering through the bottom opening 54 in the general direction of this opening emerges again through the top opening 56. It is thus ensured that, when a jet of pressurised water is oriented so as to enter the bottom opening 54, a large part of the flow emerges without being diverted through the top openings 56. The residual flow entering the entry portion 44 must fill the groove 34 before being able to rush into the passage 46 connecting with the second portion. If the flow is still very powerful at this level, it causes an axial movement of the gasket 50 parallel to the rotation axis of the bearing, the gasket thus closing the passage 48 to the third portion and to the bearing.

An external deflector 52 is described here, situated radially outside the thrust bearing 14, to protect the labyrinth 42, which can be termed external in the sense that it is situated radially outside the housing 15 of the stop bearing 14. The same principle is applicable for protecting the passage 60 existing between the cover 18 and the support piece 16 at the internal periphery of the stop. This is because this passage 60, also conformed as a labyrinth, can also in certain uses be sprayed by pressurised jets with a risk of penetration of water inside the housing 15 through an entry portion 62 situated radially inside the housing 15, that is to say between the housing 15 and the rotation axis 100. An internal deflector 64 is therefore provided, connected to the cover 18 by bridges 55 disposed opposite this entry portion so as to form two bottom 66 and top 68 openings constituting two passage channels from the outside in the entry portion 62. The top opening 68 is situated in line with the bottom opening 66, in the sense that it is possible to trace a light ray 70 entering through the bottom opening 66 and emerging through the top opening 68 without being diverted and without entering the entry portion 62.

Naturally, various variants are possible. The deflector may be attached to the cover or to the support piece. It may also be an integral part of the support piece.

The invention claimed is:

1. Suspension stop device for a suspension arm of a vehicle, the arm being provided with a coil spring, the device comprising:
    a stop bearing defining a rotation axis of the device and provided with a bottom metal washer turning with respect to a top metal washer;
    a support piece made from synthetic material for transmitting to the bottom washer forces exerted by the spring, the support piece comprising a support zone for the bottom washer; and
    a cover covering the top washer, the cover and the support piece define a housing for the bearing therein, the cover and the support piece define an annular labyrinth connecting the housing to the outside, and
    an annular deflector, the annular deflector and the cover define at least one top opening and the annular deflector and the support piece define at least one bottom opening, the top and bottom openings constituting top and bottom entry channels from the outside into a same entry portion of the labyrinth.

2. Device according to claim 1, wherein the deflector is disposed so that it is possible to make a light ray enter through the bottom opening so that the light ray emerges through the top opening without entering the entry portion of the labyrinth.

3. Device according to claim 1, wherein the labyrinth also comprises at least one second portion connecting the entry portion to the bearing.

4. The device according to claim 3, wherein the entry portion in the labyrinth extends from the deflector radially towards a rotation axis.

5. Device according to claim 4, wherein the entry portion is connected to a second portion of the labyrinth by an axial annular opening, and the second portion of the labyrinth connects the entry portion to the bearing.

6. Device according to claim 5, wherein the entry portion extends radially towards the rotation axis as far as an annular groove, and the axial annular opening connecting the entry portion to the second portion is situated radially outside the annular groove.

7. Device according to claim 1, wherein the device also comprises a sealing gasket working by sliding contact, disposed in the labyrinth.

8. Device according to claim 7, wherein the sealing gasket is disposed in the second portion.

9. Device according to claim 7, wherein the sealing joint is able to slide over a sliding surface of the support piece and over a sliding surface of the cover.

10. Device according to claim 1, wherein the deflector forms an integral part of the cover.

11. Device according to claim 1, wherein the deflector is attached to one of the cover and the support piece.

12. Device according to claim 1, wherein the entry portion of the labyrinth is disposed radially outside the housing.

13. Device according to claim 1, wherein the entry portion of the labyrinth is disposed radially inside the housing.

* * * * *